US006663132B1

(12) United States Patent
Kizy

(10) Patent No.: US 6,663,132 B1
(45) Date of Patent: Dec. 16, 2003

(54) REMOTELY CONTROLLED ELECTRO-HYDRAULIC TOWING ASSEMBLY

(75) Inventor: Khalil P. Kizy, Warren, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/252,915

(22) Filed: Sep. 23, 2002

(51) Int. Cl.⁷ .............................. B60D 1/26; B60D 1/40
(52) U.S. Cl. .................................... 280/479.1; 414/563
(58) Field of Search .............................. 280/477, 478.1, 280/479.1, 479.2, 479.3; 414/563

(56) References Cited

U.S. PATENT DOCUMENTS

| | | | | |
|---|---|---|---|---|
| 4,773,667 A | * | 9/1988 | Elkins | 280/479.3 |
| 4,955,777 A | * | 9/1990 | Ineson | 414/426 |
| 5,772,230 A | * | 6/1998 | Kemnitz | 280/491.3 |
| 6,357,779 B1 | * | 3/2002 | Mok et al. | 280/478.1 |
| 6,581,695 B2 | * | 6/2003 | Bernhardt et al. | 172/439 |
| 2002/0125018 A1 | * | 9/2002 | Bernhardt et al. | 172/439 |

* cited by examiner

*Primary Examiner*—Kevin Hurley
(74) *Attorney, Agent, or Firm*—David L. Kuhn; Gail S. Soderling; Clifford C. Carter

(57) ABSTRACT

A towing assembly is mounted to the rear of a robotic vehicle. The assembly has motors and hydraulic cylinders which are actuated to manipulate a lunette, pintle or other hitching element. Manipulation of this hitching element brings it into connection with a complementary element on a vehicle to be towed. The motors and cylinders can be remotely controlled and a camera on the robotic vehicle allows a human operator at a remote site to monitor the operation of the towing assembly.

4 Claims, 2 Drawing Sheets

REMOTELY CONTROLLED ELECTRO-HYDRAULIC TOWING ASSEMBLY

GOVERNMENT USE

The invention described here may be made, used and licensed by the or for the U.S. Government for governmental purposes without paying me any royalty.

BACKGROUND

Robotic vehicles have long been studied by military organizations because they provide a way to accomplish dangerous missions without risk to human life. For example, robotic vehicles have been developed for mine clearing and recovery of unexploded artillery shells on firing ranges. Another duty that could be advantageously performed by robotic vehicles is recovery of stranded vehicles in a battle space. Such duty not only involves risks of land mines and enemy fire, but could also involve the risks presented by nuclear, biological and chemical warfare. For the robotic vehicle to recover other vehicles it needs a mechanism to adjust the position of a lunette, hook, pintle or like towing hardware once it has arrived in front of the stranded vehicle. It also needs a mechanism to detect whether the positioning of the hardware is proceeding as desired and whether a successful connection with the stranded vehicle has occurred. My invention comprises an electro-hydraulic towing assembly that manipulates the aforementioned towing hardware into connection with complementary hardware of a vehicle to be towed. My invention also has means to monitor and control the towing assembly's operation.

SUMMARY

The towing assembly includes a lunette or other hitching element connected to a primary hydraulic cylinder. Actuating the cylinder moves the lunette closer or further from a complimentary hitching element on another vehicle. The cylinder is mounted to a post so that it has two degrees of rotational freedom. Thus, the cylinder can swing up and down in a vertical plane or can swing side-to-side in a horizontal plane in order to move the lunette to a desired position. The side-to-side swinging motion of the cylinder is accomplished by a reversible electric motor mechanically connected, directly or indirectly, to the cylinder. The vertical swinging of the primary cylinder is accomplished by a secondary hydraulic cylinder connected thereto. The post is translatable along a guideway so that the post and cylinder can be moved together closer or further from the hitching element on the other vehicle. The translation of the post and cylinder is done by a motor mechanically connected to the post.

The overall invention, of which the towing assembly is part, has a camera on the robotic vehicle. The camera views the towing assembly and sends video signals to a human operator at a station remote from the robotic vehicle, whereby the operator can monitor the assembly's operation. The station has input devices, such as joysticks or levers, whose manipulation results in signals that control the operation of the motors and cylinder. By using the camera and the input devices, the operator can keep using the towing assembly to reposition the lunette until it connects with the complementary hitching element on the other vehicle.

DETAILED DESCRIPTION

Figure 1:
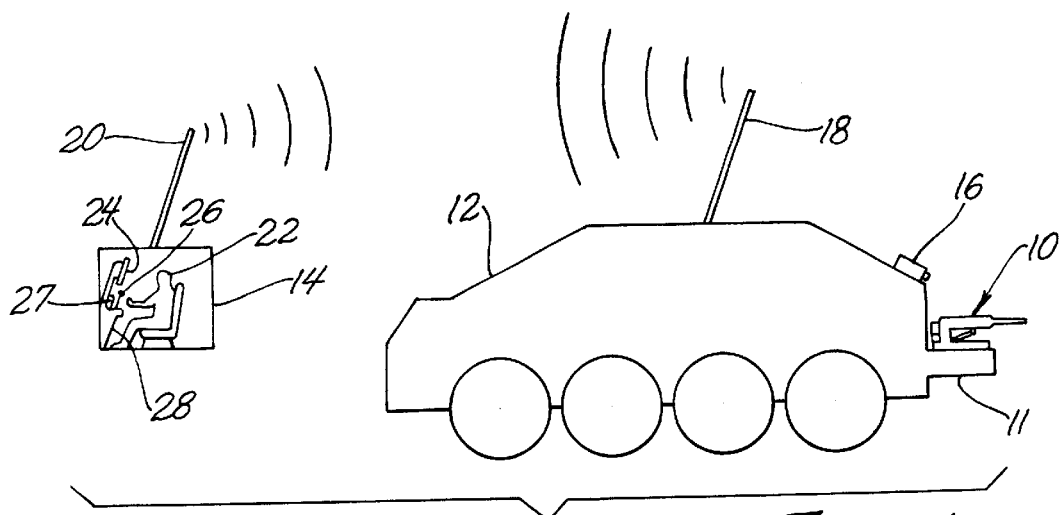
FIG. 1 is a simplified view of a system having an electro-hydraulic towing assembly on a robotic vehicle and a remote station controlling the vehicle.

FIG. 1 shows the overall system in which the electro-hydraulic towing assembly functions wherein a robotic vehicle 12 is controlled from a station 14, which is typically remote from vehicle 12 but which may be aboard the vehicle if desired. Vehicle 12 has a towing assembly 10 affixed either directly to the vehicle frame or to a vehicle component 11 that is solidly connected to the frame. Vehicle 12 has a camera 16 aimed at assembly 10 and has antenna 18 by which video signals from camera 16 are transmitted to station 14. Station 14 has a complementary antenna 20 for sending signals to vehicle 12 and receiving signals therefrom.

It is contemplated that a human driver 22 in the station will control vehicle 12 and the operator will view output from camera 16 on a monitor screen 24. For that reason, the station includes one or more operator output device such as a joystick 26 and lever 27 mounted on console 28. A mouse, keyboard, switches or any other conventional input mechanisms can be used instead of the lever or the joystick. Movement of lever 27 and joystick 26 generates control signals to govern the operation of towing assembly 10. As an option, driver 22 may be an artificial intelligence unit instead of a human.

Figure 2:
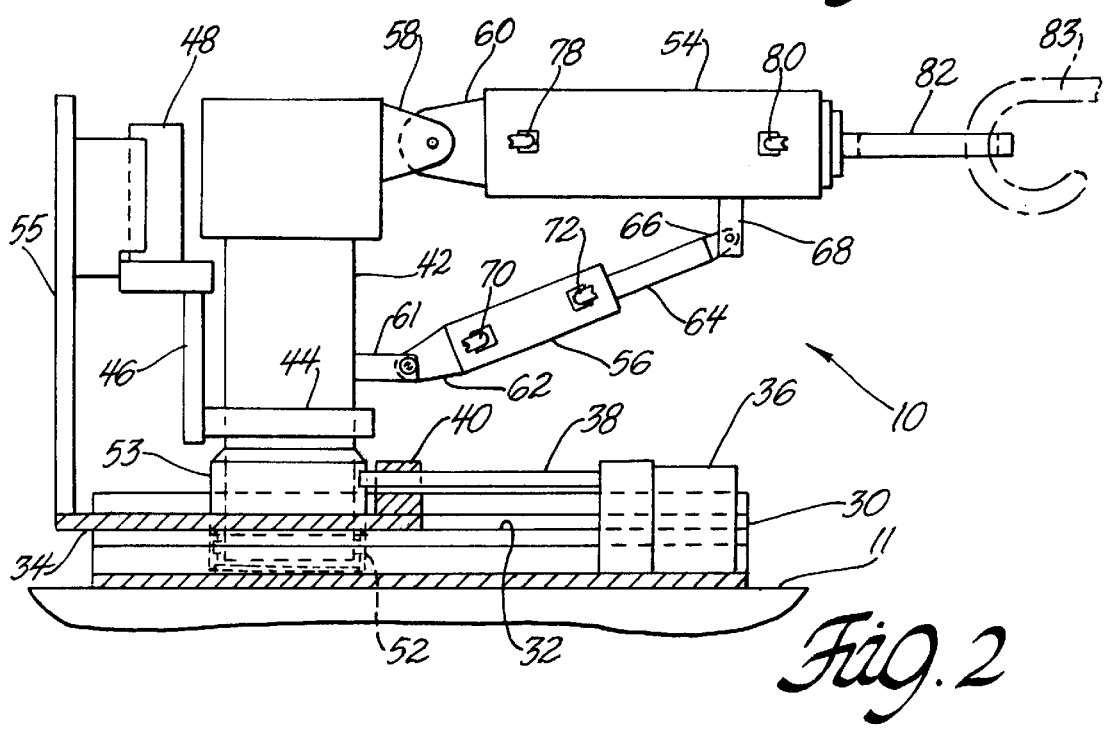
FIG. 2 is a side view of an electro-hydraulic towing assembly.
Figure 3:
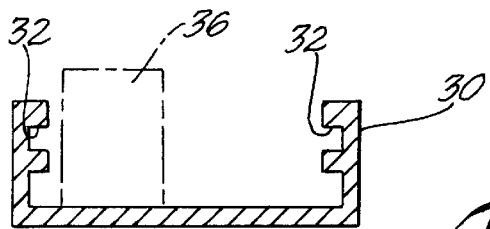
FIG. 3 is a cross-sectional view of a channel of the towing assembly showing how one of the assembly's motors is disposed in the channel.

FIG. 2 shows details of the towing assembly 10, which includes a guideway preferably in the form of grooved channel 30, a cross sectional view of which is shown in FIG. 3. Rails or keyways can, in appropriate cases, be used instead of a channel. Channel 30 is typically affixed to a vehicle component 11 that is solidly connected to the vehicle's frame, but channel 30 can also be affixed directly to the frame. Channel 30 defines grooves 32, which accommodate complementary ridges or edges of a sliding member that translates along the channel. Typically such a sliding member will be a base plate 34, whose edges fit in grooves 32. Mounted on the bed of the channel is a reversible electric motor 36 that translates plate 34. Motor 36 is offset from the longitudinal axis of the channel as most clearly seen in FIG. 3, where motor 36 is represented by a dashed outline. Extending from motor 36 is worm gear 38, which mates with a threaded boss 40 projecting upward from the edge of plate 34, whereby actuation of motor 36 translates plate 34 toward or away from the motor.

A post 42 is rotatably mounted to plate 34 by a mounting unit 52 comprised of an arrangement of ball bearings and a race that accepts one end of the post. The post is also journalled in a rotation collar 53, which is fixed to the side of plate 34 facing away from unit 52. Fixed to and encircling post 42 is ring gear 44 whose teeth engage complementary splines on shaft 46. A reversible electric motor 48 is fixed to a rigid strut 55, which itself is affixed to plate 34. Motor 48 drives shaft 46 and thereby turns gear 44 and post 42 in either direction.

Two elements extend away from post 42, one being a primary hydraulic power cylinder 54 and the other being a secondary hydraulic power cylinder 56. Cylinder 54 is swingably connected to post 42 by a hinge comprised of a pair of bracket ears 58 that pivotally engage a flange 60 extending therebetween. Cylinder 56 is similarly connected to post 42 by a hinge comprised of tabs 61 that pivotally engage flange 62 extending therebetween. Protruding from cylinder 56 is translatable rod 64 having a flange 66 at one end. Flange 66 is pivotally engaged to tabs 68, which are fixed to cylinder 54. Actuation of cylinder 56 extends or retracts rod 64 so that cylinder 54 swings upward toward post 42 or downward away from it, thereby raising or lowering cylinder 54. Optionally, cylinder 56 can be replaced by an electric motor having a conventional internal worm gear arrangement to extend or retract rod 64.

Cylinder 56 is shown as having two ports, 70 and 72, by which hydraulic fluid enters and leaves. It is contemplated that pressure will need to be applied only through port 70, when it is desired to extend rod 64. When pressure is removed from port 70 in any suitable, conventional fashion, the weight of cylinder 54 will cause rod 64 to retract into cylinder 56. As an option, pressure can be applicable through port 72 as well, whereby cylinder 56 operates as a conventional double acting cylinder. Cylinder 56 is shown schematically in FIG. 4, where it is communicated to any known pressure supply mechanism, such as pump 88, through a fluid switch 90.

Cylinder 54 is a double acting cylinder and it has two hydraulic connection ports, 78 and 80. Pressurization through port 78 will, in conventional fashion, cause lunette or eye 82 to translate away from cylinder 54. Pressurizing port 80 will conversely retract eye 82 toward cylinder 54. Pressure through ports 78 and 80 may be supplied by a pump, shown schematically at 84 in FIG. 4, or any other known pressure supply mechanism. A conventional fluid switch 86 (FIG. 4) controls pressure flow to the ports. The cooperative action of hydraulic cylinder 54 with motor 36, motor 48 and cylinder 56 will maneuver eye 82 into engagement with hook 83 or like device on a trailer vehicle (not shown) to be towed by robotic vehicle 12. It will be appreciated that eye 82 may be replaced by a hook, pintle, trailer hitch ball or other inter-vehicle hitching element.

Figure 4:
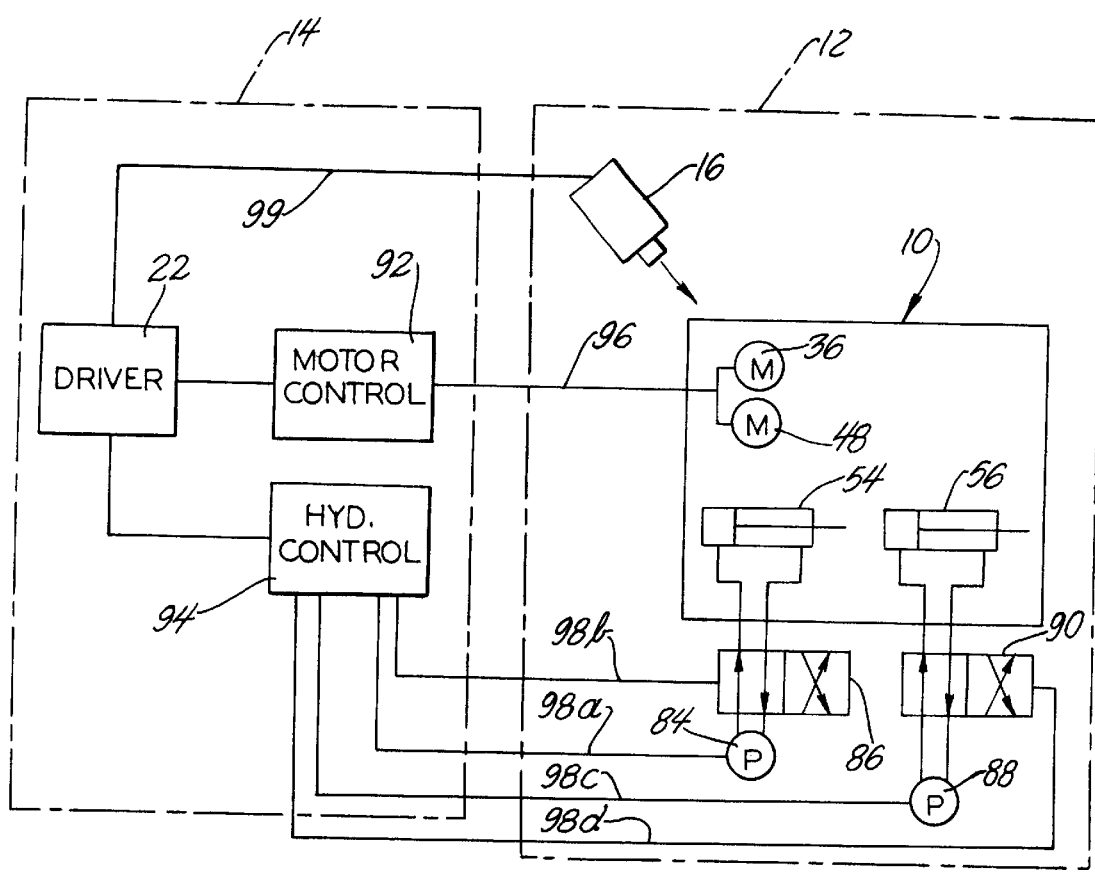
FIG. 4 is a semi-schematic diagram of the system having the electro-hydraulic towing assembly on the robotic vehicle and the remote station controlling the vehicle.

The operation of towing assembly 10 in the overall system where it functions is explained in conjunction with FIG. 4. Let us assume that robotic vehicle 12 has arrived at the location of a trailer vehicle and has been positioned such that eye 82 is near hook 83. Driver 22 then begins to use the motor control mechanism 92 and the hydraulic control mechanism 94 to maneuver eye 82 into the engagement with hook 83 shown in FIG. 2. Motor control mechanism 92 includes joystick 26 and the means to send signals from the joystick along communication path 96, which includes the radio transmission path between antennas 18 and 20 in FIG. 1. The effect of signals from the motor control mechanism is to turn a given motor in one direction, turn that motor in the opposite direction or stop that motor's turning. It is contemplated that manipulation of joystick 26 will also send signals to hydraulic control mechanism 94, which in turn sends hydraulic control signals along paths 98c and 98d. These paths include the radio transmission paths between antennas 18 and 20, and signals sent therealong control pump 88 and switch 90 respectively. In summary, manipulation of joystick 26 affects hydraulic cylinder 56 as well as motor 36 and motor 48.

Hydraulic control mechanism 94 also includes lever 27 and the means to send signals along communication paths 98a and 98b, which include the aforementioned radio transmission path. Pump 84 starts or stops in response to signals incoming along path 98a and switch 86 responds to signals from path 98b. Likewise, pump 88 starts or stops in response to signals incoming along path 98c and switch 90 responds to signals from path 98d. As driver 22 manipulates joystick 26 and lever 27, he sees the effect of his manipulations via signals sent by camera 16 along communication path 99 to monitor 24 (FIG. 1).

I do not wish to be limited to the exact details of construction or method shown herein since obvious modifications will occur to those skilled in the relevant arts without departing from the spirit and scope of the following claims.

What is claimed is:

1. A towing assembly for hook up a towing vehicle to a trailer vehicle, the assembly comprising:
    a guideway on the towing vehicle;
    a sliding member engaging the guideway;
    means for translating the sliding member along the guideway;
    a post mounted to the sliding member;
    a hydraulic cylinder;
    means for rotating the cylinder about the post;
    means disposed between the hydraulic cylinder and the post for swinging the cylinder toward or away from the post;
    a hitching element connected to the cylinder; and
    means for actuating the hydraulic cylinder.

2. A system including the towing assembly of claim 1 and further comprising:
    a station;
    means for controlling the translating means, the rotating means, the swinging means and the cylinder, the controlling means having a control input device at the station;
    a camera on the towing vehicle; and
    a monitor at the station receiving signals from the camera.

3. An electro-hydraulic towing assembly for accomplishing unmanned hook up of a towing vehicle to a trailer vehicle, the assembly comprising:
    a guideway affixed to the towing vehicle;
    a sliding member translatable along the guideway;
    a first motor fixed relative to the guideway;
    a first motor's shaft extending from the first motor into threaded engagement with the sliding member, whereby actuation of the first motor translates the sliding member along the guideway;
    a post mounted to the sliding member;
    a ring gear encircling the post
    a second motor fixed relative to the sliding member;
    a shaft of the second motor engaging the ring gear;
    a primary hydraulic cylinder pivotally connected to the post;
    a secondary hydraulic cylinder disposed between the primary hydraulic cylinder and post; and
    a hitching element attached to the primary hydraulic cylinder.

4. A system having an electro-hydraulic towing assembly for remotely controlled hook up of a robotic vehicle to a trailer vehicle, the system comprising:
    a guideway affixed to the robotic towing vehicle;
    a sliding member translatable along the guideway;
    a first motor fixed relative to the guideway;
    a first motor's shaft extending from the first motor into threaded engagement with the sliding member, whereby actuation of the first motor translates the sliding member along the guideway;

a post mounted to the sliding member;
a gear on the post
a second motor fixed relative to the sliding member;
a shaft of the second motor engaging the gear;
a primary hydraulic cylinder pivotally connected to the post;
a secondary hydraulic cylinder disposed between the primary hydraulic cylinder and post;
a hitching element attached to the primary hydraulic cylinder;
means for actuating the primary hydraulic cylinder and the secondary hydraulic cylinder;
a station;
means for controlling the motors having a motor control input device at the station;
means for controlling the actuating means having a cylinder actuation input device at the station;
a camera on the robotic vehicle; and
a monitor at the station receiving signals from the camera.

* * * * *